United States Patent Office 3,634,493
Patented Jan. 11, 1972

3,634,493
OIL-SOLUBLE AZO COMPOUNDS
Richard J. Piccolini, Willingboro, N.J., assignor to Rohm and Haas Company, Philadelphia, Pa.
No Drawing. Filed Apr. 11, 1968, Ser. No. 720,458
Int. Cl. C07c 125/06
U.S. Cl. 260—482 B
9 Claims

ABSTRACT OF THE DISCLOSURE

The oil-soluble azo compounds of this invention are useful as dispersants, corrosion inhibitors and anti-wear agents in lubricating oil and fuel compositions. The predominants oil-soluble azo reaction product may be represented by the following formulas:

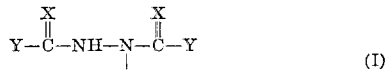

or

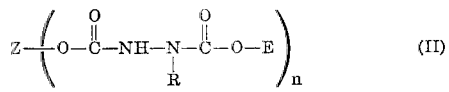

wherein
  R represents an oil-solubilizing, synthetic, polymeric organic radical containing at least 20 carbon atoms,
  Y is independently selected from the group consisting of —$OR_1$, —$NR_2R_3$ and —$SR_4$,
  $R_1$, $R_2$, $R_3$, and $R_4$ are independently selected from hydrogen, alkyl, cycloalkyl, aryl, alkaryl and aralkyl,
  X is independently selected from oxygen, sulfur and =$NR_5$, with the proviso that when X is =$NR_5$, Y is —$NR_2R_3$,
  $R_5$ is selected from the group consisting of alkyl, cycloalkyl, aryl and alkaryl,
  Z represents a polyvalent organic radical having a valence of $n$ and selected from hydrocarbon, oxahydrocarbon, azahydrocarbon and thiahydrocarbon radicals and their oxygenated and halogenated derivatives,
  E is a monovalent radical selected from alkyl, cycloalkyl, aralkyl, aryl, and alkaryl, and
  $n$ is an integer fro m2 to 5.

BACKGROUND OF THE INVENTION

Internal combustion engines used for vehicles engaged in short run travel (i.e. the so called stop and go driving) do not reach their most efficient operating temperature. Therefore large amounts of undesirable products produced by incomplete combustion of the fuel and oil-insoluble oxidation products from lubricants and other sources accumulate within the internal combustion engine. If these undesirable products deposit on the engine parts, the result is a further reduction of the engine's efficiency. To prevent the accumulation of foreign matter and the deposition of sludge, a dispersant is employed as an additive to the lubricating oil so that the oil-insoluble foreign matter and sludge will remain suspended in the oil and not deposit on any of the vital engine parts.

In addition to the problem of engine deposits, the combustion products of the fuel may cause excessive wear, especially when the engine is operating under relatively cold conditions which results in an accumulation of moisture and acid products on the engine surfaces. This accumulation promotes wear on various engine parts.

SUMMARY OF THE INVENTION

It is an object of this invention to prepare novel compounds that may be incorporated into lubricating oils or liquid hydrocarbon fuels for the purpose of dispersing sludge, inhibiting corrosion and acting as anti-wear agents.

The novel compounds of this invention may be represented by Formulas I and II above and may be prepared by reacting (a) an oil-soluble, synthetic organic polymer having at least 20 carbon atoms with (b) an azo compound having the formula:

or

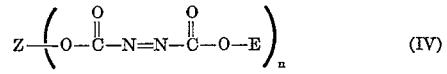

wherein X, Y, Z, E and $n$ are previously defined.

The compounds of this invention are particularly useful as dispersants in lubricating oil and fuel systems. They may be used in the range of about 0.0005% to 15% by weight of the oil or fuel composition. The compounds of this invention, as evaluated according to several standard tests, exhibit outstanding activity as dispersants.

DETAILED DESCRIPTION OF THE INVENTION

The azo compounds may be prepared by reacting (a) an oil-soluble synthetic polymer having at least 20 carbon atoms, preferably at least 50 carbon atoms, and prepared from at least one polymerizable unsaturated monomer with (b) at least one compound defined by Formulas III or IV. Azo compounds represented by Formulas III and IV are generally a well known class of organic compounds. Azo esters are described in U.S. Pat. Nos. 2,554,141 and 3,347,845. Azo amides are known from U.S. Pat. Nos. 3,190,873 and 3,366,622. Azodiformates and azodiformamides are preferred azo reactants.

The predominant oil-soluble azo reaction product of the invention may be represented by the following formulas:

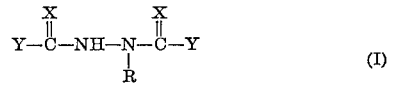

or

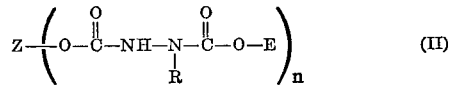

wherein
  R represents an oil-solubilizing, synthetic, polymeric organic radical containing at least 20 carbon atoms,
  Y is independently selected from the group consisting of —$OR_1$, —$NR_2R_3$ and —$SR_4$,
  $R_1$, $R_2$, $R_3$ and $R_4$ are independently selected from hydrogen, alkyl, cycloalkyl, aryl, alkaryl and aralkyl,
  X is independently selected from oxygen, sulfur and =$NR_5$, with the proviso that when X is =$NR_5$, Y is —$NR_2R_3$,
  $R_5$ is selected from the group consisting of alkyl, cycloalkyl, aryl and alkaryl,
  Z represents a polyvalent organic radical having a valence of $n$ and selected from hydrocarbon, oxahydrocarbon, azahydrocarbon and thiahydrocarbon radicals and their oxygenated and halogenated derivatives,
  E is a monovalent radical selected from alkyl, cycloalkyl, aralkyl, aryl, and alkaryl, and
  $n$ is an integer from 2 to 5, preferably 2 or 3.
  R represents an oil-soluble synthetic organic radical containing at least 20 carbon atoms that may be prepared from at least one polymerizable unsaturated monomer. Preferably R represents an alkenyl radical having a molecular weight from about 280 to about 5000 or more that is derived by polymerizing an olefin containing 2 to 25 carbon atoms, particularly 2 to 8 carbon atoms, by addition polymerization from substantially pure olefins. These olefins may be either gaseous or liquid under normal conditions and frequently are obtained from the cracking of petroleum and other hydrocarbons. Fractions containing olefinically unsaturated open-chain hydrocarbons are readily available over a wide range of molecular weights and derived from olefins of 2 to 25 carbon atoms. The preferred olefins are those from 2 to 8 carbon atoms with particular emphasis on the olefin embodiments containing 4 carbon atoms. It is, of course, desirable to employ relatively pure olefins from which sulfur and other impurities have been removed.

Mixtures of various olefins, from ethylene to pentacosene, may be used or individual embodiments, as desired. Mixtures of specific olefins, from ethylene to pentene, may be advantageously employed. Particularly advantageous for the present purposes are mixtures of the various butenes. Butenes most commonly used comprise both straight and branched chain members. It is also possible, and frequently desirable, to employ a particular isomer, such as isobutylene, but for the purpose of this invention; separation or isolation of particular isomers is not essential, Thus, the mixtures readily available to the chemical industry are especially useful for the purposes of the present invention. The olefinic polymers employed as starting materials vary from rather fluid liquids to rather viscous liquids at normal temperatures.

Olefins that are useful to provide the R group include ethylene, propylene, n-butene, isobutene, 3-pentene, 1-hexene, 2-methyl-1-heptene, 2-methyl-5-propyl-1-hexene, 1-octene, 4-octene, 1-decene, isodecene, 1-dodecene, 1-octadecene, 1-eicosene, 1-tricosene, and mixtures thereof. The R group may represent homopolymers and copolymers of the aforementioned olefin monomers as well as copolymers with an aforementioned olefin monomer and an aromatic olefin such as styrene or an alkylated styrene, a cyclic olefin such as piperylene or a polyolefin such as butadiene, 1,4-hexadiene and 1,7-octadiene.

Specific examples of oil-soluble copolymers that provide the R group include the copolymers of 85% (by weight) of isobutylene and 15% of 1-dodecene; 95% of isobutylene and 5% of styrene; 75% of ethylene and 25% of isodecene; 80% of 1-hexene and 20% of 1-heptene; and a terpolymer of 97% of isobutylene; 1% of piperylene and 1% of propylene.

Although the R group is preferably represented by a substantially olefinic polymer having a molecular weight of about 280 to 5000, other unsaturated addition polymers may be used that have a molecular weight range of up to 1,000,000 or more. The higher molecular weight polymers having molecular weights in excess of 10,000 to 300,000 or more have found to impart viscosity index improving properties as well as pour-point depressant properties to oil compositions containing such polymers. In many instances, the use of such higher molecular weight polymers is desirable to obtain multi-purpose additives for oil and fuel compositions.

Oil-soluble polymers of styrene substituted with an alkyl group having 4 or more carbon atoms, such as t-butyl styrene, and having an average molecular weight up to 600,000 or more may be used to obtain multifunctional additives. Suitable styrene polymers are decribed in United States Pat. No. 3,318,813.

Polymers of esters of acrylic acid, methacrylic acid, maleic anhydride and fumaric acid, e.g. lauryl acrylate, oleyl methacrylate, lauryl fumarate and mixed $C_8$ to $C_{18}$ methacrylates and fumarates may also be used to provide the R group. Other useful polymers include vinyl esters such as vinyl esters of coconut acids and vinyl ethers such as vinyl decyl ether and the vinyl ether of a $C_8$ alcohol. Specific copolymers that may be employed include the terpolymer of vinyl acetate, isooctyl fumarate and cetylstearyl fumarate; a copolymer from lauryl-myristyl meth-acrylate and oleyl methacrylate and a copolymer from butyl methacrylate and tetradecyl acrylate.

Although the R group has been structurally presented as attached to a specific nitrogen atom in Formulas I and II, it will be understood by those skilled in the art that the R group may be positioned on the adjacent nitrogen atom of the azo group. The R group enters the molecule represented in Formulas I and II by a reaction involving an azo compound and, therefore, it could be attached to either of the nitrogen atoms of the azo group. This invention encompasses fully this aspect.

The azo compounds that are reacted with any of the unsaturated polymers previously described are represented by Formulas III and IV. The Formula III compounds, when X is oxygen and Y is —$OR_1$, are commonly known as azodiforamtes. When X is oxygen and Y is —$NR_2R_3$, the compounds are commonly called azodiformamides. When X is sulfur in each of the above situations, the compounds are commonly referred to as azodithionformates and azodithioformamides, respectively. When X is =$NR_5$ and Y is —$NR_2R_3$, the compounds are named azodiformamidines. The compounds of Formula IV may be called polyazo esters.

In Formulas III and IV, $R_1$, $R_2$, $R_3$ and $R_4$ are independently selected from hydrogen, alkyl, cycloalkyl, aryl, alkaryl and aralkyl. $R_5$ may represent alkyl, cycloalkyl, aryl and alkaryl. E represents a monovalent radical selected from alkyl, cycloalkyl, aralkyl, aryl, and alkaryl. Preferred alkyl groups contain from 1 to 24 carbon atoms and may be represented by methyl, ethyl, butyl, t-butyl, octyl, t-octyl, n-decyl, octadecyl, eicosyl, and tetracosyl. Cycloalkyl groups of 5 and 6 carbon atoms such as cyclopentyl and cyclohexyl are preferred cycloalkyl radicals. Representative aryl groups are phenyl and naphthyl. The alkyl group of the alkaryl radical may contain from 1 to 18 carbon atoms and typical alkaryl radicals are tolyl (o, m, p), t-butylphenyl, octylphenyl and dodecylphenyl. The alkyl portion of the aralkyl may contain from 1 to 4 carbon atoms and illustrative of these radicals are benzyl, phenethyl and 3-phenylpropyl.

In Formula IV, Z represents a polyvalent organic radical selected from hydrocarbon, oxahydrocarbon, azahydrocarbon and thiohydrocarbon radicals. Representative hydrocarbon groups are alkylene having 1 to 12 carbon atoms, arylene and alkylarylene. Preferred oxahydrocarbon radicals are polyalkylene glycol radicals. Azahydrocarbon radicals may be obtained from alkanolamines such as diethanolamine, dipropanolamine and triethanolamine. Specific radicals within the scope of Z are ethylene, propylene, n-butylene, hexamethylene, decamethylene, 1,2-propylene, glyceryl, thiodiethylene, oxydiethylene phenylene, xylylene, and methylenebisphenylene.

Specific examples of Formula III type compounds include:

Dimethyl azodiformate (alternatively named dimethyl azodicarboxylate)
Diethyl azodiformate
Di-n-butyl azodiformate
Di-t-butyl azodiformate
Di-t-octyl azodiformate
Di-n-decyl azodiformate
Dioctadecyl azodiformate
Di-t-eicosyl azodiformate
Dicyclohexyl azodiformate
Diphenyl azodiformate
Dibenzyl azodiformate
Diphenethyl azodiformate
Di-p-tolyl azodiformate
Di-t-butylphenyl azodiformate
Di-t-octylphenyl azodiformate
N,N',N",N'''-tetra-n-butyl azodiformamidine
N,N',N",N'''-tetra-t-butyl azodiformamidine
N,N',N",N'''-tetraphenyl azodiformamidine
N,N',N",N'''-tetra-p-tolyl azodiformamidine
N,N',N",N'''-tetracyclohexyl azodiformamidine N,N'-dimethyl azodiformamide (alternatively named N,
  N'-dimethyl azodicarbonamide)
N,N,N',N'-tetramethyl azodiformamide
N,N'-diethyl azodiformamide
N,N,N',N'-tetraethyl azodiformamide
N,N'-di-n-butyl azodiformamide
N,N,N',N'-tetra-n-butyl azodiformamide
N,N'-di-t-butyl azodiformamide
N,N-di-t-octyl azodiformamide
N,N'-di-n-decyl azodiformamide
N,N'-dioctadecyl azodiformamide
N,N'-di-t-eicosyl azodiformamide
N,N'-dicyclohexyl azodiformamide
N-methyl-N-phenyl azodiformamide
N-ethyl-N-phenyl-N'-methyl azodiformamide
N,N'-diphenyl azodiformamide
N,N'-dibenzyl azodiformamide
N,N,N',N'-tetrabenzyl azodiformamide
N,N'-diphenethyl azodiformamide
N,N'-di-p-tolyl azodiformamide
N,N'-di-t-butylphenyl azodiformamide
N,N'-di-t-octylphenyl azodiformamide
Diethyl azodithionformate
Di-t-butyl azodithionformate
Di-t-octyl azodithionformate
Diethyl azodithiolformate
Di-t-butyl azodithiolformate
Diethyl azodi(dithioformate)
Di-t-octyl azodi(dithioformate)
Di-p-tolyl azodi(dithioformate)
N,N'-dimethyl azodithioformamide
N,N,N',N'-tetraethyl azodithioformamide
N,N'-di-t-butyl azodithioformamide Specific examples of Formula IV type compounds include:

Ethylene bis(methyl azodiformate)
Diethylene bis(ethyl azodiformate)
Diethylene bis(t-butyl azodiformate)
Oxydiethylene bis(t-butyl azodiformate)

Azodiformamidines may be prepared by reacting the corresponding carbodiimide and hydrazine followed by oxidation to the azodiformamidine.

The oil-soluble azo compounds of this invention may be prepared by reacting (a) an oil-soluble synthetic polymer having at least 20 carbon atoms and (b) at least one azo compound and defined by Formulas III and IV at a temperature of about 20° C. to 200° C., preferably 50° C. to 150° C. The time of reaction will be dependent upon the reaction temperature employed but generally the reaction will be completed within 2 to 48 hours. To aid in control of the reaction temperature as well as to provide a reaction medium, hydrocarbon or other inert solvents such as benzene, chlorobenzene, mineral oil, naphtha, n-hexane and cyclohexane may be used. The relative proportions of (a) to (b) are such that the molar ratio of the oil-soluble polymer to azo compound may vary from about 0.5:1 to 2:1 when the azo compound is within Formula III and from about 1:1 to 10:1, depending on the value of $n$, when the azo compound is within the scope of Formula IV. If the oil-soluble synthetic polymer contains a double bond and at least one hydrogen in an allylic position to it, thermal treatment is sufficient to accomplish reaction with the azo compound. Therefore polymers derived from olefins such as butene or derived from acrylic-type esters such as oleyl methacrylate having unsaturation in the alcohol portion of the ester readily react with azo compounds in the absence of an initiator.

However, unsaturated polymers containing hydrogens alpha to aromatic rings or carbonyl groups react readily with azo compounds only when a free radical initiator is present. In the absence of a free radical initiator the reaction proceeds slowly.

Suitable free radical initiators include peroxidic and azo catalysts such as azodiisobutyronitrile, dimethylazodiisobutyrate, azodiisobutyramide, benzoyl peroxide, caproyl peroxide, lauroyl peroxide, tert-butyl hydroperoxide and cumene hydroperoxide. The amount of initiator for the reaction of (a) and (b) ranges between 0.1 and 10.0 weight percent, preferably between about 1.0 and 3.0 weight percent of the total amount of (a).

The compounds of this invention are useful as dispersants in lubricating oil and fuel systems. They may be used in the range of about 0.0005% to 15% by weight of the oil or fuel composition and may be incorporated therein according to standard techniques. In fuels, the range is 0.0005% to 5%, preferably 0.005% to 2%, by weight of the fuel composition. In lubricants, the range is 0.1% to 15%, preferably 0.1% to 10%, by weight of the lubricant composition. The compounds of the present invention, as evaluated according to several known tests, exhibit outstanding activity as dispersants.

The following describes some of the tests employed in evaluating the compounds of the present invention:

API Service MS Sequence V-A Test.—This test evaluates the sludge dispersant characteristics of a lubricant under low and medium temperature operating conditions. A single cylinder oil test engine is operated under conditions described in ASTM Special Technical Publication No. 315, published by the American Society for Testing and Materials, 1916 Race Street, Philadelphia, Pa., 19103. The engine may be rated at any time during the course of the test. The 7 parts rated for sludge (CRC Merit, 10=clean) are the rocker arm assembly, rocker arm cover plate, valve deck, timing gear cover, push rod cover plate, push rod chamber and oil pan.

Panel Coker Test.—This test is described in the record of the Fifth World Petroleum Congress (1959) in an article by R. N. Jolie, "Laboratory Screening Test for Lubricating Oil Detergents and Dispersants." A sample of a compound under test is dissolved in a 170 SUS Mid-Continent Solvent Extracted Neutral containing 1% of a thermally unstable zinc dialkyldithiophosphate. The blend is placed in a heated sump and is splashed against a heated panel held at 570° F. for 2 hours. Gain in weight of the panel is determined and compared with oil without the test compound.

Sundstrand Pump Test.—In this test for distillate fuel oils, 1 liter of fuel oil containing 4 grams of synthetic sludge is treated with the additive. The oil is circulated for an hour through a Sundstrand oil burner pump containing 100-mesh strainer. The sludge deposit is collected and weighed (Nelson, Osterhaut and Schwindeman, Ind. Eng. Chem., 48, 1892 (1956)).

As will be clearly understood in the art, the fuels contemplated are distillate fuels that boil from 75° to 750° F. which includes gasolines, along with jet and Diesel fuels and furnace oils. The present compounds are particularly useful in fuels that boil up to about 600° F., that is, the normal gasolines and jet fuels and similar liquid hydrocarbon fuels.

Lubricating compositions of this invention may be based on mineral oils or on synthetic lubricants. The mineral oils may vary over a wide range of viscosity, such as 1 to 25 cs. at 210° F. These oils may be of naphthenic or paraffinic nature or may be of various mixtures. They may be distillates or mixtures of neutral oils and bright stocks. The lubricants may be bodied or gelled and used as greases, if desired. The oils may vary from spindle oils or hydraulic oils to oils for reciprocating aircraft engines. They include oils for sparking combustion and compression ignition engines, varying from grades identified as S.A.E. 5 to S.A.E. 50. Other types of lubricants are also included, such as hydraulic and automatic transmission fluids.

The synthetic lubricants include esters, such as dioctyl, dinonyl or diisodecyl adipates, azelates or sebacates, polyethers and silicones. When use as hydraulic fluids is contemplated, phosphate esters are included as a base.

In the present compositions, there may also be used as a base, a transmission fluid, hydraulic fluid, gear oil or grease.

In the compositions of this invention, there may be used one or more other additives, such as anti-oxidants, anti-foam agents, anti-rust agents, anti-wear agents, heavy duty detergents, pour-point depressants, viscosity index improvers, or other type of additive. For example, there may be employed one or more dithiophosphates, such as zinc, barium or nickel dialkyldithiophosphate, sulfurized oils, such as sulfurized sperm oil and sulfurized terpenes, phenols, sulfides, alkylaryl sulfonates, petroleum sulfonates, whether normal or with alkaline reserve, such as calcium, barium or magnesium petroleum sulfonates, polymers and copolymers from alkyl acrylates, methacrylates, itaconates, or fumarates or vinyl carboxylates and mixtures thereof, copolymers of acrylic esters and polar monoethylenically unsaturated compounds, such as N-vinyl-2-pyrrolidinone, vinylpyridines, aminoalkyl acrylates or methacrylates or polyethyleneglycol acrylic esters, polybutenes, alkylphenolalkylene oxide condensates, alkenylsuccinic anhydrides, various silicones and alkyl or aryl phosphates, such as tricresyl phosphates.

There may also be used 4,4'-methylenebis-2,6-di-tert-butylphenol, trialkylphenols, tris(dimethylaminomethyl) phenol, phenothiazine, naphthylamines, N'-sec-butyl-N,N-dimethyl-p-phenylenediamine, alkaline earth alkylphenates, alkaline earth salicylates, calcium phenylstearate, alkylamines, especially $C_{12}$–$C_{24}$ alkylamines, cyclic amines, alkyl and aryl imidazolines and alkenylsuccinic anhydrides reacted with amines and then with boron compounds, such as boron oxide, boron halides and boron esters.

A turbo prop lubricant may be prepared by blending the compounds of this invention with di-2-ethylhexyl sebacate and a mixture of polyesters formed by condensing 2-ethyl-1,3-hexanediol and sebacic acid into the polyesters with 2-ethyl-hexanol, there being an average of about 3 glycol units per molecule. This composition may also contain anti-oxidant, stabilizer or other useful additives.

The compounds, compositions and method of the present invention may be more fully understood from the following examples which are offered by way of illustration and not by way of limitation. Parts by weight are used throughout.

Example 1

A reaction flask equipped with a stirrer and thermometer in an electrically heated oil bath was charged with 295 parts of polybutene of molecular weight of about 1185 and 50 parts of diethyl azodiformate. These materials were stirred at 90° C. for 10 hours followed by stripping at 90° C. and a vacuum of 0.1 mm. for 2 hours to remove any unreacted azo ester. The product was filtered and the clear amber material was analyzed and found to contain 1.6% nitrogen. The predominant reaction product was diethyl N-(polybutenyl)bicarbamate.

In the Panel Coker Test, a blend containing 1.0% of the above bicarbamate product gave a deposit weight of 39 mg. The same oil without the additive gives a deposit weight of 322 mg.

In the Sundstrand Pump Test at 0.01 gram in 100 ml. of oil, the weight of sludge is 186 mg., while the oil without any additive gives 200 mg.

1.4 parts of the above bicarbamate product was blended with 1.0 part of a commercial zinc dialkyl dithiophosphate and 6.0 parts of a commercial viscosity index improver into 91.6 parts of a 170 SUS Mid-Continent Solvent Extracted Neutral Oil. The viscosity of this blend is 10.92 cst. at 210° F. and 60.42 cst. at 100° F. with a viscosity index of 147. The ASTM pour-point is −30° F. This blend is evaluated in the Sequence V–A test giving a sludge rating at the end of 75 hours of engine operation of 53.6 (70.0=clean). The value for the reference oil alone is 39.7.

Example 1A

Three parts of the bicarbamate product of Example 1 was blended with 0.7 part of 4,4'-methylenebis(2,6-di-t-butylphenol), 1.0 part of tricresyl phosphate and 0.3 part of sulfurized sperm oil into 95 parts of a 170 SUS Mid-Continent Solvent Extracted Neutral Oil. The viscosity of this blend was 6.08 cst. at 210° F. and 40.23 cst. at 100° F. with a viscosity index of 106. This blend, when evaluated in the Sequence V–A Test, gave a sludge rating at the end of 75 hours of 63.6 (70.0=clean). The value of the reference oil alone is 39.7.

Example 1B

Three parts of the bicarbamate product of Example 1 was blended with 1 part phenothiazine and 1 part of tricresyl phosphate into 95 parts of a 1:1 mixture of diisooctyl adipate and diisodecyl adipate. The fluid is tested in the corrosion and oxidation stability test at 347° F., as described in Federal Test Method No. 5308, and required for Aircraft Turbine Engine Lubricating Oil Specification MIL–L–7808. The appearance of the oxidation tube is clean as compared to a comparable test without the bicarbamate product.

Example 1C

Three parts of the bicarbamate product of Example 1 was blended with 5 parts of a commercial automatic transmission fluid additive and 4.5 parts of a commercial viscosity index improver into 87.5 parts of a 4.0 cst. at 210° F., 95 viscosity index base oil. The resulting blend has a viscosity of 7.5 cst. at 210° F.

The blend was tested under conditions of Federal Test Method 5308 at 300° F. At the end of 300 hours, the paper spot test showed the sludge to be dispersed. A similar test on a fluid without the bicarbamate product failed at the end of 72 hours.

Example 2

A reaction flask equipped with a stirrer and thermometer in an electrically heated oil bath was charged with 100 parts of polybutene having a molecular weight of about 1185 and 25 parts of N,N'-di-t-octyl azodiformamide. The stirred solution was heated at 130° C. for 5 hours. After filtration, the clear amber material was analyzed and found to contain 1.88% N. The reaction product was predominantly N,N'-di(t-octyl carboxamido polybutenyl) hydrazine.

In the Panel Coker Test, a blend containing 1.0% of the above bicarbamamide product gave a deposit weight of 42 mg. The same oil without the additive gives a deposit weight of 322 mg.

In the Sunstrand Pump Test at 0.05 gram in 100 ml. of oil, the weight of sludge is 86 mg., while the oil without any additive gives 200 mg.

1.4 parts of the above bicarbamamide product was blended with 1.0 part of a commerical zinc dialkyl dithiophosphate, 6.0 parts of a commercial viscosity index improver and 1.5 parts of a basic calcium sulfonate (total Base No. of 300) into 90.1 parts of a 170 SUS Mid-Continent Solvent Extracted Neutral Oil. The viscosity of this blend is 11.03 cst. at 210° F. and 65.2 cst. at 100° F. with a viscosity index of 142. The ASTM pour-point is −35° F. This blend is evaluated in the Sequence V–A test giving a sludge rating at the end of 75 hours of engine operation of 51.6 (70.0=clean). The value for the reference oil alone is 39.7.

Example 3

A reaction flask equipped with a stirrer, condenser and thermometer in an electrically heated oil bath was charged with 500 parts of a copolymer prepared from 163 parts of lauryl-myristyl methacrylate and 10 parts of oleyl methacrylate and having an average number molecular weight of about 300,000, 1000 parts chlorobenzene and 16 parts di-t-butyl azodiformate. The stirred solution was held at 120° for six hours, 500 parts of 100 SUS oil were added and then the solution was stripped at 120° C. and 0.1 mm. pressure for 2 hours. The filtered product is amber and had a nitrogen content of 0.2%. The reaction product consisted essentially of di-t-butyl-N-(polymethacrylate)bicarbamate.

In the Panel Coker Test, a blend containing 2.0% of the above bicarbamate product gave a deposit weight of 64 mg. The same oil without the additive gives a deposit weight of 322 mg.

12.0 parts of the above bicarbamate product was blended with 1.0 part of a commercial zinc dialkyl dithiophosphate into 87.0 parts of a 170 SUS Mid-Continent Solvent Extracted Neutral Oil. The viscosity of this blend is 10.62 cst. at 210° F. and 65.04 cst. at 100° F. with a viscosity index of 139. The ASTM pour-point is −30° F.

Example 4

To a reaction flask equipped with a stirrer, thermometer and a condenser in an electrically heated bath, 328 parts of polybutene of molecular weight 960 and 50 parts of dimethyl azodiformate were charged. These materials are stirred at 90° C. for 10 hours followed by stripping at 90° C. and a vacuum of 0.1 mm. for 2 hours. The product is filtered and the clear amber product was analyzed and found to contain 2.0% nitrogen. The reaction product was predominantly dimethyl N-(polybutenyl)bicarbamate.

In the Panel Coker Test, a blend containing 1.0% of the above bicarbamate product gave a deposit weight of 63 mg. The same oil without the additive gives a deposit weight of 322 mg.

1.4 parts of the above bicarbamate product was blended with 1.0 part of a commercial zinc dialkyl dithiophosphate, into 98.0 parts of a 170 SUS Mid-Continent Solvent Extracted Neutral Oil. The viscosity of this blend is 5.94 cst. at 210° F. and 39.52 cst. at 100° F. with a viscosity index of 103. The ASTM pour-point is −5° F. This blend is evaluated in the Sequence V–A test giving a sludge rating at the end of 75 hours of engine operation of 62.8 (70.0=clean). The value for the reference oil alone is 39.7.

Example 5

To a reaction flask equipped with a stirrer and a thermometer in an electrically heated bath, 258 parts of polypropylene having a molecular weight of about 900 and 50 parts of diethyl azodiformate were charged. These materials were stirred at 90° for 10 hours followed by stripping at 90° and 0.1 mm. for 2 hours. The diethyl N-(polybutenyl)bicarbamate product was filtered and the amber viscous product contained 2.1% nitrogen.

In the Panel Coker Test, a blend containing 1.0% of the above bicarbamate product gave a deposit weight of 39 mg. The same oil without the additive gives a deposit weight of 322 mg.

In the Sundstrand Pump Test at 0.1 gram in 100 ml. of oil, the weight of sludge is 26 mg., while the oil without any additive gives 200 mg.

1.4 parts of the above bicarbamate product was blended with 1.0 part of a commercial zinc dialkyl dithiophosphate and 6.7 parts of a commercial viscosity index improver into 90.9 parts of a 170 SUS Mid-Continent Solvent Extracted Neutral Oil. The viscosity index is 143. The ASTM pour-point is −35° F.

Example 6

To a reaction flask equipped with a stirrer and a thermometer in an electrically heated bath, 261 parts of polyoctene having a molecular weight of about 910 and 50 parts diethyl azodiformate were charged. These materials were stirred at 90° for 12 hours followed by stripping for 2 hours at 0.1 mm. at 90° C. The diethyl N-(polyoctenyl) bicarbamate product was filtered and the amber product was found to contain 2.1% nitrogen.

In the Panel Coker Test, a blend containing 1.0% of the above bicarbamate product gave a deposit weight of 36 mg. The same oil without the additive gives a deposit weight of 322 mg.

In the Sundstrand Pump Test at 0.1 gram in 100 ml. of oil, the weight of sludge is 16 mg., while the oil without any additive gives 200 mg.

5.0 parts of the above bicarbamate product was blended with 1.0 part of a commercial zinc dialkyl dithiophosphate and 5.0 parts of a commercial viscosity index improver into 89.0 parts of a 170 SUS Mid-Continent Solvent Extracted Neutral Oil. The viscosity of this blend is 11.84 cst. at 210° F. and 66.55 cst. at 100° F. with a viscosity index of 146. The ASTM pour-point is −30° F. This blend is evaluated in the Sequence V–A test giving a sludge rating at the end of 75 hours of engine operation of 67.3 (70.0=clean). The value for the reference oil alone is 39.7.

Example 7

A reaction flask equipped with a stirrer, thermometer and a reflux condenser in an electrically heated oil bath was charged with 520 parts of polybutene of molecular weight 1185, 1000 parts of chlorobenzene and 100 parts N,N'-di-n-butyl azodiformamide. The solution was refluxed for 24 hours and vacuum stripped at 120° and 0.1 mm. for 2 hours. The filtered N,N'-di(n-butyl carboxamido) polybutenyl hydrazine product was a clear amber and contained 2.4% nitrogen.

In the Panel Coker Test, a blend containing 1.0% of the above bicarbamamide product gave a deposit weight of 26 mg. The same oil without the additive gives a deposit weight of 322 mg.

In the Sundstrand Pump Test at 0.1 gram in 100 ml. of oil, the weight of sludge is 39 mg., while the oil without any additive gives 200 mg.

3.6 parts of the above carbamamide product was blended with 1.0 part of a commercial zinc dialkyl dithiophosphate, 9.4 parts of a commercial viscosity index improver and 3.0 parts of a basic calcium sulfonate (total base No.=300) into 83.0 parts of a 150 SUS Mid-Continent Solvent Extracted Neutral Oil. The viscosity of this blend is 14.63 cst. at 210° F. and 88.9 cst. at 100° F. with a viscosity index of 142. The ASTM pour-point is −40° F. This blend is evaluated in the Sequence V–A test giving a sludge rating at the end of 75 hours of engine operation of 65.8 (70.0=clean). The value for the reference oil alone is 39.7.

Example 8

To a reaction flask equipped with a stirrer and a thermometer in an electrically heated oil bath, 391 parts of a copolymer having a molecular weight of about 900 and prepared from 85 parts of isobutylene and 15 parts of dodecene-1 were charged together with 100 parts of di-n-butyl azodiformate. These materials were heated for 10 hours at 90° C. and stripped at 120° C. for 2 hours at 0.1 mm. pressure. The clear amber filtered predominantly di-n-butyl N-(copolybutenyldodecenyl)bicarbamate product was found to contain 2.0% nitrogen.

In the Panel Coker Test, a blend containing 1.0% of the above bicarbamate product gave a deposit weight of 32 mg. The same oil without the additive gives a deposit weight of 322 mg.

In the Sundstrand Pump Test at 0.1 gram in 100 ml. of oil, the weight of sludge is 41 mg., while the oil without any additive gives 200 mg.

4.2 parts of the above bicarbamate product was blended with 1.0 part of a commercial zinc dialkyl dithiophosphate into 94.8 parts of a 500 SUS Mid-Continent Solvent Extracted Neutral Oil. The viscosity of this blend is 11.64 cst. at 210° F. and 65.2 cst. at 100° F. with a viscosity index of 96.5. The ASTM pour-point is +5° F. This blend is evaluated in the Sequence V–A test giving a sludge rating at the end of 75 hours of engine operation of 61.0

Example 9

To a reaction flask equipped with a stirrer, thermometer and a condenser, 343 parts of a copolymer prepared from 95 parts isobutylene and 5 parts styrene and having an average number molecular weight of about 960, 750 parts of chlorobenzene and 100 parts N,N'-dicyclohexyl azodiformamide were charged. The solution was refluxed 12 hours and stripped at 120° C. and 0.1 mm. pressure for 2 hours. The N,N'-di(cyclohexyl carboxamido) copolybutenylstyryl hydrazine product after filtration was a clear amber viscous liquid containing 2.3% nitrogen.

In the Panel Coker Test, a blend containing 1.0% of the above bicarbamide product gave a deposit weight of 75 mg. The same oil without the additive gives a deposit weight of 322 mg.

In the Sundstrand Pump Test at 0.1 gram in 100 ml. of oil, the weight of sludge is 43 mg., while the oil without any additive gives 200 mg.

Example 10

To a reaction flask equipped with a stirrer, thermometer and a condenser, 176 parts of a copolymer prepared from 75% ethylene and 25% isodecene and having an average number molecular weight of about 900 and 100 parts of diethyl azodiformate was charged. The mixture was heated 10 hours at 90° and vacuum stripped at 100° and 0.1 mm. pressure for 2 hours. Filtration produced a clear amber predominantly diethyl N-(copolyethylenedecenyl) bicarbamate product containing 2.1% nitrogen.

In the Panel Coker Test, a blend containing 1.0% of the above bicarbamate product gave a deposit weight of 33 mg. The same oil without the additive gives a deposit weight of 322 mg.

In the Sundstrand Pump Test at 0.1 gram in 100 ml. of oil, the weight of sludge is 36 mg., while the oil without any additive gives 200 mg.

Example 11

To a reaction flask equipped with a stirrer, thermometer and a condenser, a mixture containing 100 parts of 100 SUS neutral mineral oil, 90 parts poly(p-tert-butylstyrene) having an average molecular weight of about 400,000 and 10 parts diethylazodiformate were charged. These materials were heated to 90° C. and 0.5 part of benzoyl peroxide were added over 8 hours at two hour intervals. After filtration and vacuum stripping at 90° C. and 0.1 mm. pressure for 2 hours, the amber reaction product was found to contain 0.8% nitrogen. The reaction product isolated from the oil was found to contain 1.6% nitrogen and consisted essentially of diethyl-N-(poly-p-tert-butylstyryl) bicarbamate. Evaluation of the bicarbamate indicated that it was a satisfactory dispersant.

Example 12

To a reaction flask equipped with a stirrer and a thermometer 550 parts of polybutene of molecular weight of about 1185 and 76 parts diethylene glycol-bis(ethyl azodiformate) were charged. These materials were heated to 90° C. for 24 hours with stirring and the material was then filtered through 30 parts of a 2:1 Celite-silicic acid mixture to remove unreacted starting material. The final amber reaction product was analyzed and found to contain 1.8% nitrogen. The reaction product was a satisfactory dispersant.

The predominant reaction product is defined by Formulas I and II. Depending upon the nature and amount of unsaturation in the oil-soluble synthetic organic polymer moiety of the reaction product, additional quantities of azo compounds described in Formula III or IV may react at one or more of the remaining unsaturated sites on the oil-soluble polymer. Therefore more than one mole of azo compound may react with one mole of oil-soluble polymer.

I claim:

1. A compound of the formula

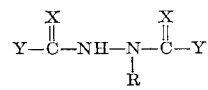

wherein R represents an oil-solubilizing, synthetic, polymeric organic radical containing at least 20 carbon atoms,
Y is $-OR_1$,
$R_1$ is selected from hydrogen, alkyl of 1 to 24 carbon atoms, cycloalkyl of 5 to 6 carbon atoms, aryl, alkaryl wherein the alkyl portion contains 1 to 18 carbon atoms and aralkyl wherein the alkyl portion contains 1 to 4 carbon atoms,
and X is oxygen.

2. A compound according to claim 1 wherein R represents an alkenyl radical having an average molecular weight of about 280 to about 5000.

3. A compound according to claim 1 wherein R contains at least 50 carbon atoms.

4. A compound according to claim 1 wherein R represents a polybutenyl radical having an average molecular weight from about 280 to about 5000.

5. A compound according to claim 1 wherein R represents an alkenyl radical having at least 20 carbon atoms, X is oxygen and Y is $-OR_1$.

6. A compound according to claim 5 wherein $R_1$ is ethyl.

7. A compound of claim 1 wherein the compound is diethyl N-(polybutenyl)bicarbamate.

8. A compound of claim 1 wherein the compound is dimethyl N-(polybutenyl)bicarbamate.

9. A compound of claim 1 wherein the compound is di-t-butyl-N-(polymethacrylate)bicarbamate.

References Cited

UNITED STATES PATENTS 3,192,196  6/1965  Vidal et al. _____ 260—468 X

LORRAINE A. WEINBERGER, Primary Examiner

P. KILLOS, Assistant Examiner

U.S. Cl. X.R.

260—564 B, 567